United States Patent [19]

Tsukada et al.

[11] Patent Number: 4,650,931
[45] Date of Patent: Mar. 17, 1987

[54] CORDLESS TELEPHONE

[75] Inventors: Keizo Tsukada, Tokyo; Masato Yamagata, Kanagawa, both of Japan

[73] Assignee: Sony Corporation, Tokyo, Japan

[21] Appl. No.: 733,953

[22] Filed: May 14, 1985

[30] Foreign Application Priority Data

May 17, 1984 [JP] Japan .................................. 59-99265

[51] Int. Cl.$^4$ ............................................... H04Q 7/04
[52] U.S. Cl. ...................................... 379/61; 379/159; 379/388
[58] Field of Search ................. 179/2 E, 2 EA, 2 EB, 179/2 EC, 18 DA, 18 BF

[56] References Cited

U.S. PATENT DOCUMENTS

| | | | |
|---|---|---|---|
| 4,392,243 | 7/1983 | Ohhashi et al. ........................ | 455/74 |
| 4,468,539 | 8/1984 | Schober ............................ | 179/2 EA |
| 4,468,540 | 8/1984 | Cripps ............................... | 179/2 EA |
| 4,469,918 | 9/1984 | Cripps ............................... | 179/2 EA |
| 4,471,166 | 9/1984 | Cripps ............................... | 179/2 EA |

FOREIGN PATENT DOCUMENTS 2918494 11/1980 Fed. Rep. of Germany ... 179/2 EA

Primary Examiner—Robert G. Lev
Attorney, Agent, or Firm—Lewis H. Eslinger; Alvin Sinderbrand

[57] ABSTRACT

A cordless telephone having a base unit and a separate handset unit is operable in an intercom mode in which operators at the two units are in telephonic communication. If an incoming telephone call appears when the telephone is in the intercom mode, the loudspeaker of the handset unit and a ringer of the base unit both produce a ringing sound to announce the call. When one unit is then disabled by the operator thereof hanging up, the other unit is automatically connected to the telephone network line to receive the incoming call. The handset unit produces the ringing sound from its loudspeaker at a first volume when it is disabled and in a standby mode, and at a second lesser volume when it is enabled and in the intercom mode to avoid producing a loud ringing sound directly into the ear of the handset operator.

19 Claims, 5 Drawing Figures

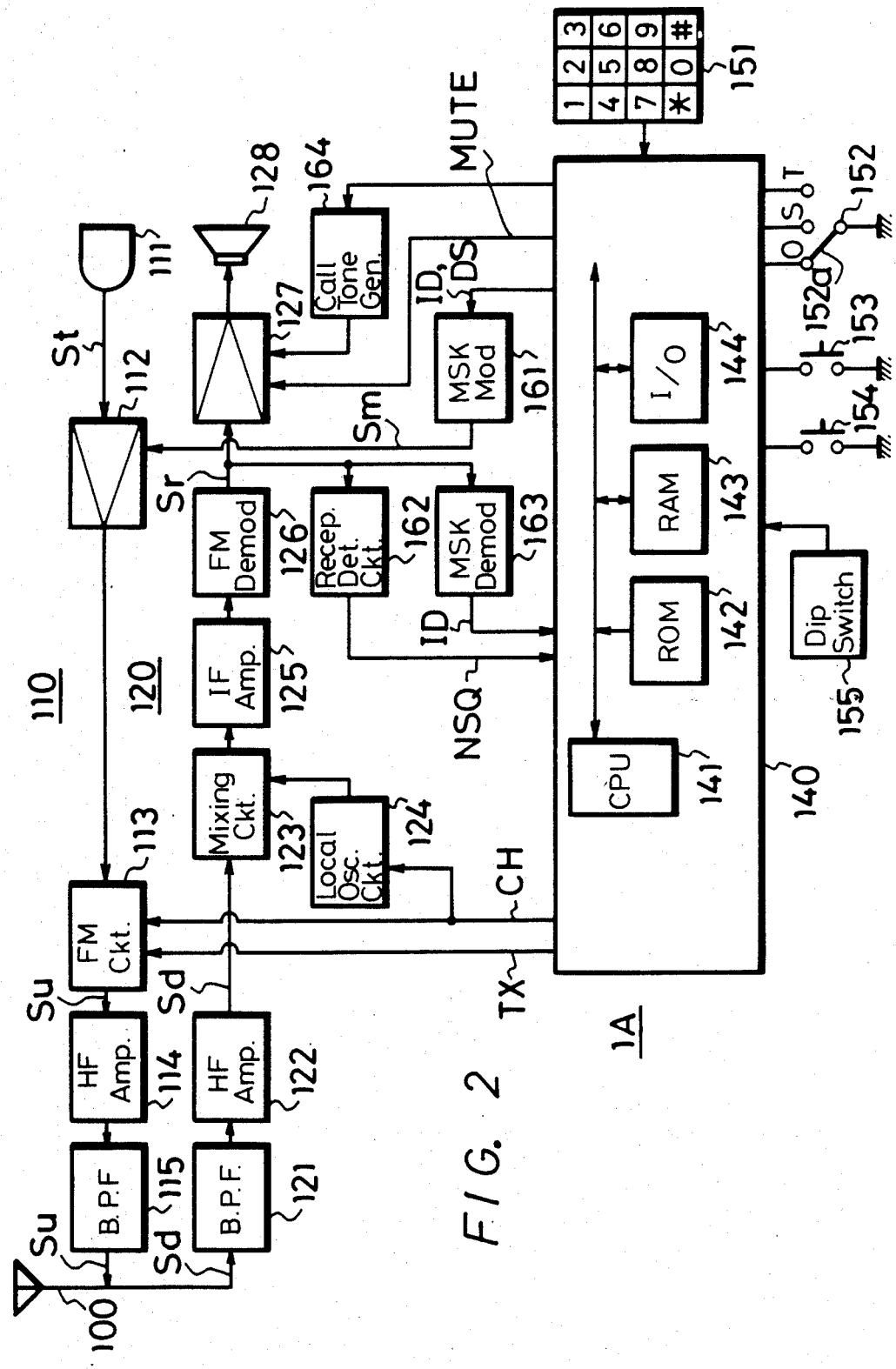
F I G. 2

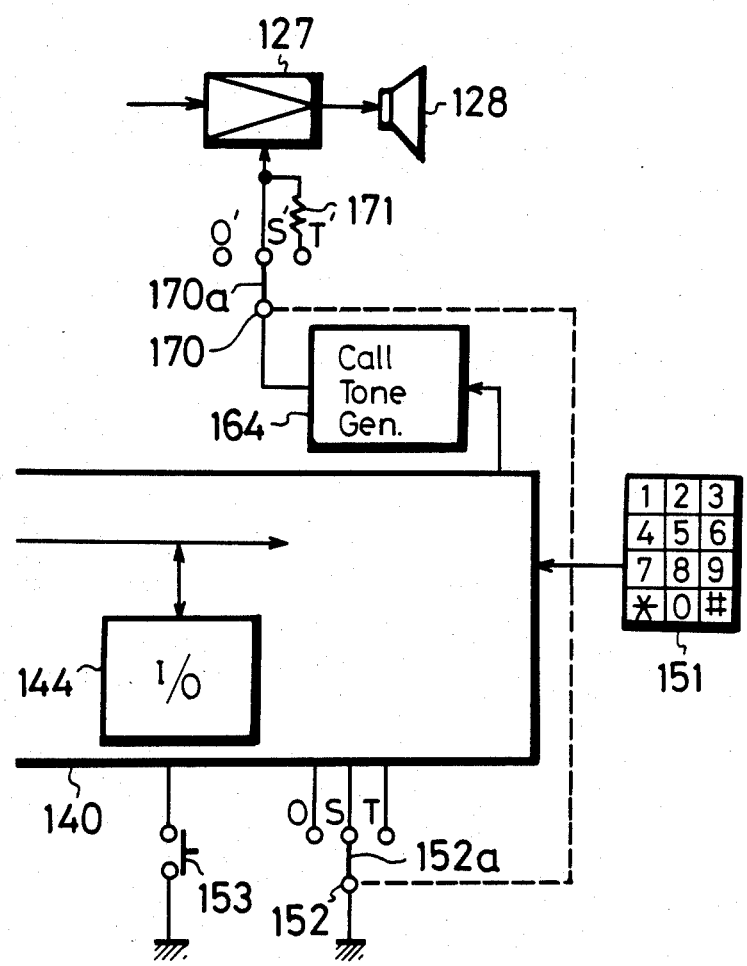

CORDLESS TELEPHONE

RELATED APPLICATIONS

U.S. patent application Ser. No. 06/696,183, filed Jan. 29, 1985 in the name of persons having an obligation of assignment to the assignee of the present invention and commonly assigned herewith, U.S. patent application Ser. No. 722,359, filed 4-12-85, in the name of persons having an obligation of assignment to the assignee of the present invention and commonly assigned herewith, U.S. patent application Ser. No. 725,341, filed 4-19-85, in the name of persons having an obligation of assignment to the assignee of the present invention and commonly assigned herewith.

FIELD OF THE INVENTION

The present invention relates generally to cordless telephones, and in particular relates to a cordless telephone operable in an intercom mode.

BACKGROUND OF THE INVENTION

The standard telephone consists of a base unit and a handset unit connected to each other by an electrical cord. The base unit itself is connected by another cord to a receptacle on a wall, telephone pole or a similar immovable structure to which the telephone network line extends. Therefore, the range of movement of the operator of the telephone is quite limited. Even when the cords connecting the handset unit to the base unit and the base unit to the wall are long, it can be cumbersome to move either the entire telephone around to make calls from different locations or to walk around with the handset unit once a call has been placed. The simple fact that there is always a continuous physical connection between the person making the phone call and the immovable wall or other fixed structure can be a great inconvenience.

The cordless telephone represents a significant improvement over the standard telephone. In the conventional cordless telephone, the base unit is still connected to the receptacle on the immovable wall or the like by a cord so that message signals from the telephone network line may be received and transmitted. However, the handset unit of the cordless telephone is an independently operative unit from which calls may be made and by which calls may be received with no physical connection to the base unit. Instead, the base unit and the handset unit of the cordless telephone communicate with each other over a communication channel established by the transmission and reception of electromagnetic waves, conventionally radio waves. The handset unit may then be taken to distances of up to 300 meters from the base unit, while still making and receiving telephone calls.

The handset unit has a transmitting/receiving system or transceiver and a loudspeaker in the earpiece and a microphone in the mouthpiece. In some cordless telephones, the base unit also has a loudspeaker and microphone either incorporated within the base unit itself or in an auxiliary standard telephone connectable to both the base unit and the outside telephone network line. When the base unit receives an incoming call, the base loudspeaker/microphone can be used to converse directly with the caller.

Two modes of operations are possible. In the telephone mode of operation, either the base unit or the handset unit is in communication with the outside telephone network line, and in the intercom mode of operation, the base unit and the handset unit are in communication with each other. This makes operation of the cordless telephone very convenient.

When such an intercom mode is available, there is the possibility that an incoming telephone call will appear when the cordless telephone is in the intercom mode. To announce the presence of the incoming call, both the handset unit and the base unit will ring. The handset unit conventionally rings by producing a ringing sound from its loudspeaker. When the handset operator is talking to the base operator, he is holding the handset unit with the loudspeaker directly next to his ear. The normal ringing sound could be unpleasant or painfully loud under these circumstances.

Prior art cordless telephones of this type have had a mode switch on the base unit which is actuated when an incoming call appears in the intercom mode to cause a changeover from the intercom mode to the telephone mode with the base unit in communication with the telephone network line. However, the operation of such prior art mode switches has been inconvenient and unduly complicated, leading to a likelihood of misactuation by those who are unfamiliar with cordless telephones in particular and electronic devices in general. It would be advantageous to provide a cordless telephone with an operation so simple that it is unnecessary to understand how it works in order to operate it successfully.

A further disadvantage of the described prior art cordless telephone is that only the base operator can answer the incoming telephone call since the mode switch is provided only on the base unit. This limits the flexibility of the cordless telephone.

OBJECTS AND SUMMARY OF THE INVENTION

Accordingly, it is an object of the present invention to provide an improved cordless telephone which eliminates the difficulties of the prior art.

It is another object of the present invention to provide a cordless telephone in which either one of the handset and base units may receive an incoming telephone call which appears when the telephone is in the intercom mode.

It is another object of this invention to provide a cordless telephone in which, if an incoming call appears when the telephone is in the intercom mode of operation, either of the handset and base units may be actuated to withdraw from the intercom mode and automatically connect the other of the units with the telephone network line to receive the incoming telephone call.

It is a further object of this invention to provide a cordless telephone which generates a ringing sound with a low volume when the telephone is in the intercom mode.

It is still another object of the present invention to provide a cordless telephone with the aforesaid capabilities which may be operated easily and conveniently.

It is yet another object of the present invention to provide a cordless telephone with the aforesaid capabilities having a minimum number of actuable switches for performing these functions.

In accordance with an aspect of the present invention, there is provided a cordless telephone comprising a base unit connectable to a telephone network line for receiving and transmitting signals therethrough, and a handset unit selectively mountable upon and separable from the base unit. The base and handset units have respective transceiver means for the transmission and reception of signals therebetween over electromagnetic waves, the handset unit including handset loudspeaker/microphone means and the base unit having base loudspeaker/microphone means associated therewith. The telephone has a telephone mode of operation wherein the loudspeaker/microphone means of either of the base unit or the handset unit is in communication with the telephone network line, and an intercom mode of operation, wherein the base and handset loudspeaker/microphone means are in communication with each other, and means for selectively establishing the telephone in one of the telephone and intercom modes are provided. Call detecting means detects an incoming telephone call appearing on the telephone network line to produce a detected signal in response thereto. First bell sound generating means at the handset unit generates a bell sound in response to the detected signal at least in the intercom mode, and second bell sound generating means at the handset unit generates a second bell sound in response to the detected signal at least in the intercom mode. Intercom stop means receive the detected signal and are then selectively actuable at one of the handset and base units so as to be operative in the intercom mode for causing the first and second bell sound generating means to cease generating the first and second bell sounds, respectively, and for causing the means for selectively establishing the telephone in one of the modes to establish the telephone mode with the loudspeaker/microphone means of the other of the base and handset units in communication with the telephone network line.

In accordance with another aspect of the present invention, the handset unit has talk and standby modes wherein the means for selectively establishing one of the telephone and intercom modes is enabled and disabled, respectively, and actuable switch means are provided for selectively establishing one of the talk and standby modes. The handset bell sound generating means is responsive to the detected signal from the call detecting means to generate the second bell sound at a first volume in the standby mode and at a second, reduced volume when the handset unit is in the talk mode while in the intercom mode of the telephone. The lesser volume of the second bell sound avoids producing a painfully loud noise directly in the ear of the handset operator.

In a preferred embodiment of the cordless telephone according to the present invention, the base loudspeaker/microphone means are constituted by an auxiliary standard telephone connectable to both the telephone network line and the base unit. The intercom stop means in this embodiment includes the conventional switch within the standard telephone actuated when the receiver is returned to its cradle.

In a another preferred embodiment of the cordless telephone according to the present invention, the base loudspeaker/microphone means is incorporated within the base unit itself, and the intercom stop means includes an actuable switch and relay circuits within the base unit.

The above, and other objects, features and advantages of the cordless telephone according to the present invention will become apparent from the following detailed description of the preferred embodiments and the accompanying drawings, throughout which like reference numerals designate like elements and parts.

BRIEF DESCRIPTION OF THE DRAWINGS

FIG. 2 is a block diagram illustrating a portion of the circuitry of a handset unit of a cordless telephone according to a first preferred embodiment of the present invention;

FIG. 5 is a block diagram illustrating a portion of the circuitry of a handset unit of a cordless telephone according to a second preferred embodiment of the present invention.

DESCRIPTION OF THE PREFERRED EMBODIMENTS

Figure 1:
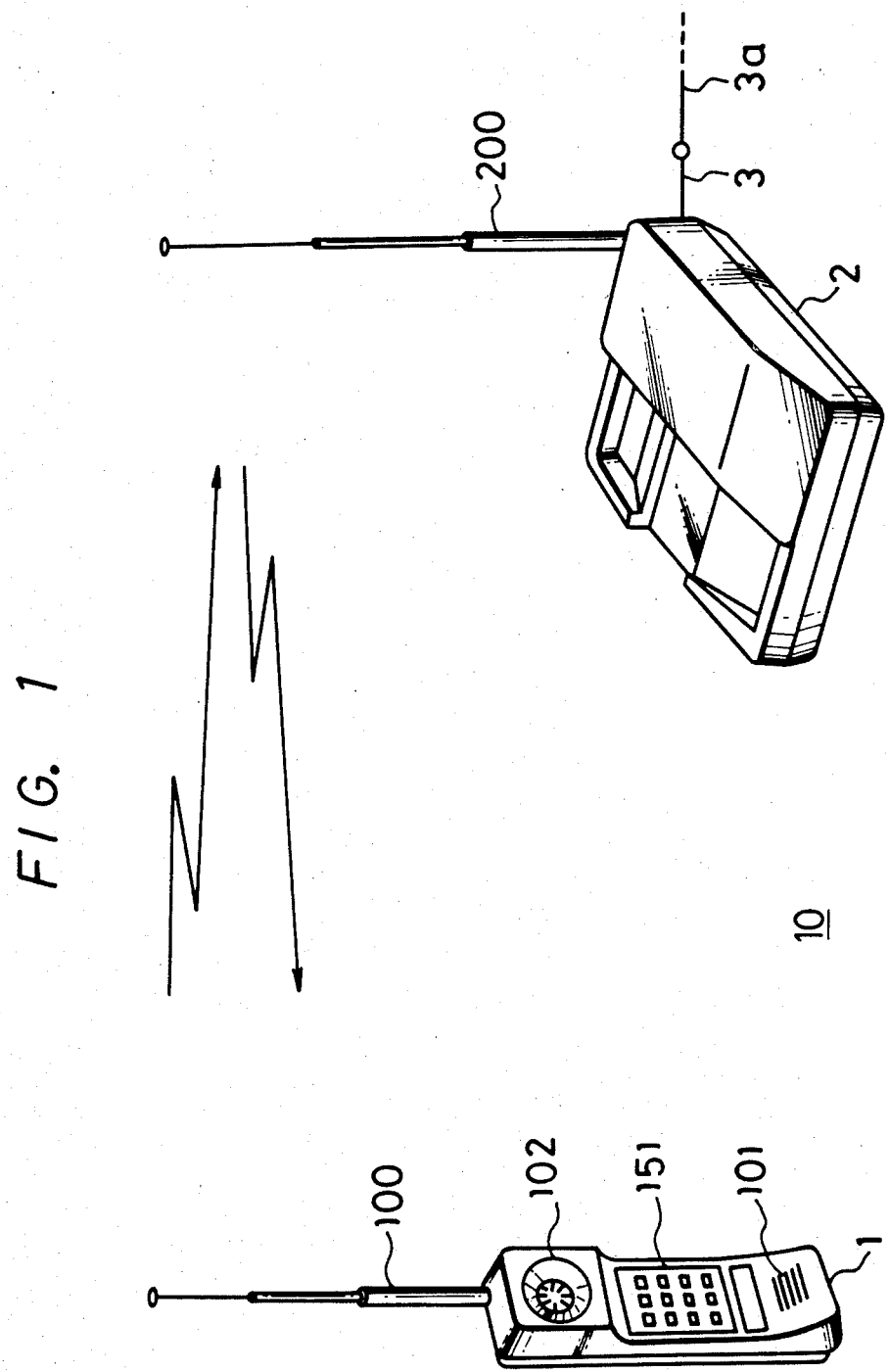
FIG. 1 is a perspective view of a cordless telephone of a type to which the present invention may be applied, and with a handset unit being shown separated from a base unit.

Referring to the drawings in detail, and initially to FIG. 1 thereof, a cordless telephone 10 of a type to which the present invention may be applied is there shown to include a handset unit 1 and a base unit 2. Base unit 2 is connected by a telephone cord 3 to an outlet or receptacle in a wall, a telephone pole, or another fixed structure, so that it may both receive and transmit telephone message signals through a telephone network line 3a and also may be powered thereby. An antenna 100 on handset unit 1 and a corresponding antenna 200 on base unit 2 are used to create a communication channel between the two units by the transmission and reception of radio waves, schematically illustrated in FIG. 1 by the arrows extending between the antennas. As is conventional, handset unit 1 includes a ten-key panel 151 for making or dialing outgoing calls, and a mouthpiece 101 and an earpiece 102 with which a microphone and a loudspeaker (not shown) are, respectively, associated. A telephone number may be entered on ten-key panel 151, and corresponding information is transmitted over the communication channel to base unit 2 and thence to telephone network line 3a. Alternatively, when base unit 2 receives a message signal from the telephone network line indicating that an incoming call is present, a signal from base unit 2 causes a ringing sound in handset unit 1 and a second ringing sound in base unit 2 to indicate the existence of the incoming call.

The standard maximum separation of such a handset unit 1 and base unit 2, which is called the service area, is about 300 meters, and is set by the Federal Communications Commission. Typically there are ten duplex channels permitted for each system, with the upper channel having a frequency in the 49 MHz band and the lower channel having a frequency in the 46 MHz band. Of course, such operating parameters are set by the FCC and do not form a part of the present invention.

Before describing the structure and operation of cordless telephone 10 according to the present invention, the operating modes thereof will be described. In a telephone mode of operation, a selected one of the base and handset loudspeaker/microphone means is in communication with telephone network line 3a. In an intercom mode of operation, the base and handset loudspeaker/microphone means are in communication with each other and not in communication with telephone network line 3a. Any incoming telephone call appearing on telephone network line 3a is held by a suitable connection device, conventionally including relays, and is available should cordless telephone 10 be subsequently established in the telephone mode. It is possible for cordless telephone 10 to be established in the intercom mode without an incoming telephone call appearing on telephone network line 3a, and for an incoming telephone call to then appear on telephone network line 3a. Cordless telephone 10 according to the present invention is advantageously adapted to receive an incoming telephone call which appears when the telephone is in the intercom mode.

Figure 3:
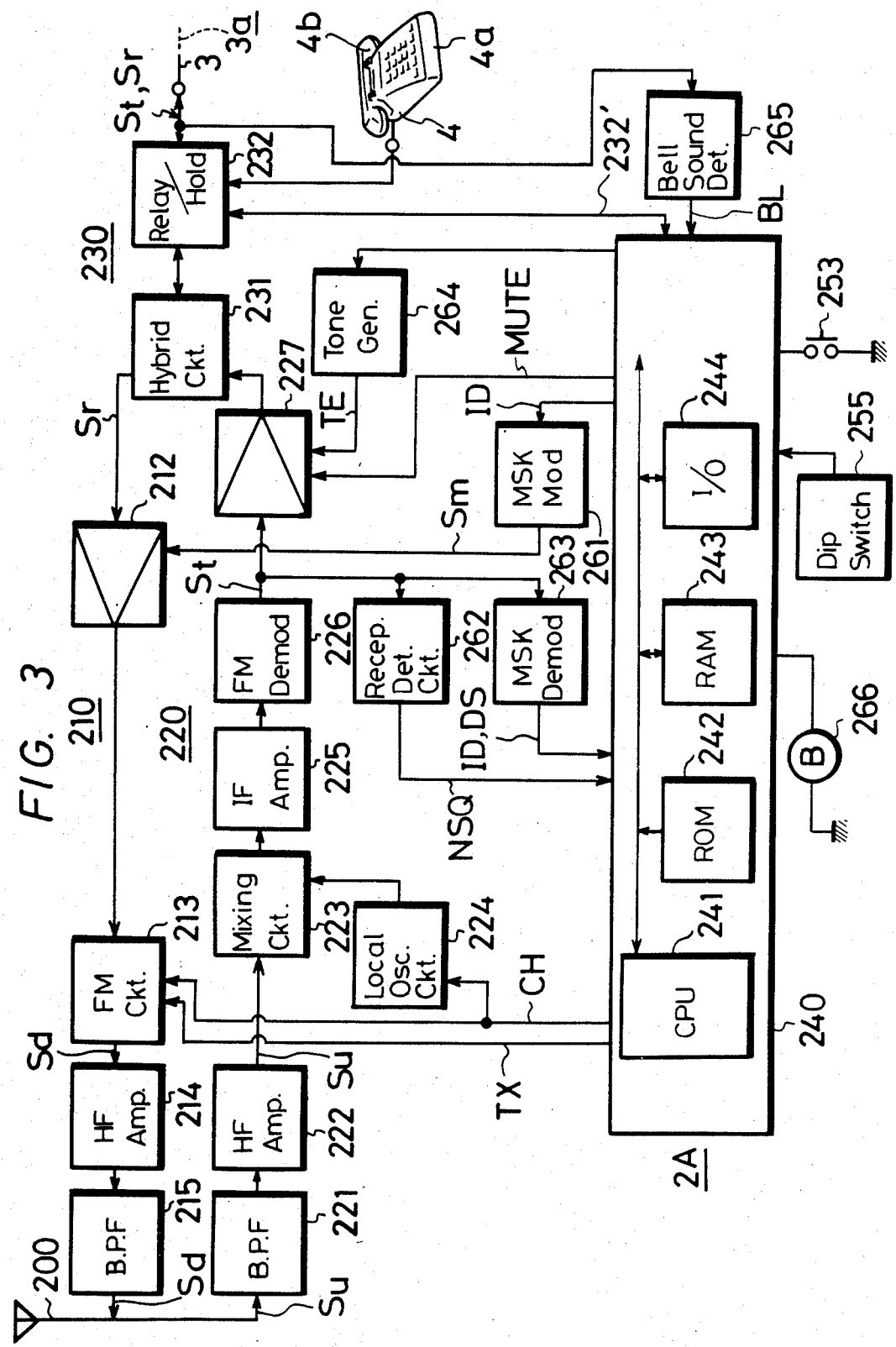
FIG. 3 is a block diagram illustrating a portion of the circuitry of a base unit of the cordless telephone according to the first preferred embodiment.

Referring now to FIGS. 2 and 3, important portions of the circuitry contained within handset unit 1A and base unit 2A, respectively, of a cordless telephone according to the present invention are therein illustrated. It should be noted that the circuitry within these two units contains many corresponding elements, so that the two figures and their accompanying description should be considered together.

Handset unit 1A (FIG. 2) has a transceiver which includes a transmission system 110 comprised of elements bearing reference numerals 111 to 115, and a receiving system 120, comprised of elements bearing reference numerals 121 to 128. Base unit 2A (FIG. 3) similarly has a transceiver which includes a transmission system 210 comprised of elements bearing reference numerals 212 to 215, and a receiving system 220 comprised of elements bearing reference numerals 221 to 227. Base unit 2A further includes a connecting circuit 230, including elements 231 and 232, and serving to connect the transmission system 210, the receiving system 220 and an auxiliary telephone 4 to telephone network line 3a. In a first preferred embodiment, auxiliary telephone 4 having a body 4a and a receiver 4b is used as the loudspeaker/microphone or electro-audio transducer associated with base unit 2A. For a better understanding of the present invention, the function and operation of these elements will be described as signals are transmitted between the two units. In the illustrated embodiment, the signals are transmitted over a selected one of two allowed duplex channels, A and B, each containing an upper channel and a lower channel.

Therefore, for the transmission of a signal from handset unit 1A (FIG. 2), an audio signal St from a microphone 111 contained within mouthpiece 101 of handset unit 1A is supplied through an audio frequency amplifier 112 to a frequency modulating circuit 113, which outputs a corresponding high frequency FM signal Su in the upper channel of a selected one of duplex channels A or B. For this purpose, frequency modulating circuit 113 is provided with a channel selecting signal CH generated in accordance with the operation of a channel selector switch 154. Channel selector signal CH may be used to determine the frequency of a local oscillator signal used to frequency convert the FM signal to radio frequencies. Signal Su is supplied through a high frequency amplifier 114 and a band pass filter 115 with a pass band including both upper channels to antenna 100, by which it is transmitted as a radio frequency wave to base unit 2A over the communication channel.

Referring now to FIG. 3, signal Su transmitted from handset unit 1A is received at base unit 2A by antenna 200 and is supplied through a band pass filter 221 and a high frequency amplifier 222 to a mixing circuit 223. Mixing circuit 223 receives a local oscillation signal from a local oscillator circuit 224 receiving channel selecting signal CH to frequency convert the signal Su to an FM intermediate frequency signal. This FM signal is supplied through an intermediate frequency amplifier 225 to an FM demodulating circuit 226, wherein it is demodulated to produce audio signal St. Audio signal St is passed to telephone network line 3a through an audio frequency amplifier 227 and the signal transmission circuit 230 comprising hybrid circuit 231, and relay circuit 232. Hybrid circuit 231 has solid state components and moving contacts to form a transition between the electronic receiving system 220 and electromechanical relay circuit 232. Relay circuit 232 includes a relay of the type to make and break the connection between base unit 2A and telephone network line 3a, and a hold relay which in a first position can hold a connection with telephone network line 3a while disconnecting it from hybrid circuit 231 and auxiliary telephone 4, so that telephone communication with telephone network line 3a is temporarily interrupted during an intercom operation while keeping the incoming call available on telephone network line 3a. This operation is referred to herein as reserving the incoming call. The hold relay has a second position in which telephone network line 3a is made available for connection to hybrid circuit 231, auxiliary telephone 4, or both. This operation is referred to as releasing the incoming call.

Auxiliary telephone 4 is thus connectable by relay circuit 232 to telephone network line 3a to constitute the base loudspeaker/microphone or electro-audio transducer in the intercom telephone system associated with base unit 2A.

The transmission of signals from base unit 2A to handset unit 1A will now be described. When incoming message signals are received from telephone network line 3a, the audio signal Sr is supplied through relay circuit 232, hybrid circuit 231 and audio frequency amplifier 212 to a frequency modulating circuit 213, which outputs a corresponding high frequency FM signal Sd in the lower channel of the same duplex channel (A or B) as signal Su. Frequency modulating circuit 213 is supplied with channel selecting signal CH for this purpose. Signal Sd is supplied through a high frequency amplifier 214 and a band pass filter 215 with a pass band including the lower channels of both A and B channels to antenna 200, by which it is transmitted to handset 1A over the communication channel.

Referring back to FIG. 2, signal Sd is received by antenna 100 and is supplied through a band pass filter 121 with a pass band including both lower channels and a high frequency amplifier 122 to a mixing circuit 123. Mixing circuit 123 is supplied with a local oscillation signal from a local oscillator circuit 124 receiving channel selecting signal CH, so that signal Sd is frequency converted to an FM intermediate frequency signal. This FM signal is supplied through an intermediate frequency amplifier 125 to an FM demodulating circuit 126, wherein it is demodulated to the audio signal Sr and supplied through an audio frequency amplifier 127 to an electro-audio transducer or loudspeaker 128 contained within an earpiece of handset unit 1A.

In accordance with an important aspect of the present invention, handset unit 1A further contains a control circuit, generally designated by reference numeral 140 in FIG. 2, and base unit 2A similarly contains a control circuit, generally indicated by reference numeral 240 in FIG. 3. These control circuits may each advantageously be comprised in whole or in great part by a microprocessor or microcomputer, contained on a single integrated chip. An advantageous example is the MSM-6404 microcomputer IC manufactured by Oki Electric Industry Co., Ltd. Control circuit 140 includes a central processing unit (CPU) 141, for 4-bit parallel processing, a read only memory (ROM) 142, which stores control programs for controlling the operation of CPU 141, a random access memory (RAM) 143 serving as a work and storage area, and an input/output (I/O) port 144.

Similarly in base unit 2A, control circuit 240 includes a CPU 241, a ROM 242, a RAM 243 and an I/O port 244, each performing a function corresponding to that of the element of control circuit 140 having the same two final digits in the reference numeral. A detailed description is given below of the operation and control of these elements, but it should be understood that a control circuit such as control circuits 140 and 240 may, under the control of an appropriate control program, be designed to perform different functions at different times and to control the operation of several elements. At each stage of operation of the control circuit by the control program, the control circuit may be viewed as a means for performing a certain function. According to an important aspect of the present invention, the cordless telephone in the intercom mode is responsive to detection of an incoming telephone call and subsequent actuation to establish the telephone mode, and at such time control circuits 140,240 may be regarded as intercom stop means. Similarly, one of the telephone and intercom modes of the cordless telephone according to this invention may be established in response to actuation of certain keys. At such time, control circuits 140, 240 may be regarded as means for selectively establishing one of the telephone and intercom modes. In accordance with another aspect of the present invention, two identifying codes are compared for identity to establish the communication channel, and at such time control circuits 140, 240 may be regarded as identity detecting means. The discussion below will make clear at all times what functions control circuits 140 and 240 are performing and precisely how such functions are carried out.

Connected to control circuit 140 for controlling the latter are ten-key panel 151, a talk switch 152, an intercom key 153, the above-mentioned channel selector key 154, and a dip switch 155. Ten-key panel 151 has conventional non-lock push button switches for inputting the telephone number to be called. Talk switch 152 is a three position change-over switch used for selecting an operational mode of handset unit 1A. When a movable contact 152a of talk switch 152 contacts fixed contact O (the OFF position), the power is turned off to all the elements within handset unit 1A except control circuit 140, to place handset unit 1A in an off mode. When movable contact 152a contacts fixed contact S (the STANDBY position), control circuit 140 is placed in a standby mode to await the signal Sd from base unit 2A. When movable contact 152a contacts fixed contact T (the TALK position), handset unit 1A is placed in a talk mode and the communication channel between handset unit 1A and base unit 2A may be established. Clearly, handset unit 1A must be in the talk mode to allow cordless telephone 10 to be in the intercom mode, or else the handset operator could not communicate with the base operator. Indeed, in accordance with one aspect of the present invention, placing talk button 152 in the STANDBY or OFF position when cordless telephone 10 is in the intercom mode and an incoming telephone call is present achieves actuation of the intercom stop means thus constituted by control circuits 140, 240.

Channel selector key 154 is a non-lock push button switch for selecting either channel A or B for the communication channel between handset unit 1A and base unit 2A. This signal specifies the desired upper or lower channel by specifying the frequency dividing ratio of a variable frequency dividing circuit contained within local oscillator circuit 124. Dip switch 155 may be an IC with pins selectively set by the operator to enter respective binary values and is used by the operator to input a selected identifying code ID to control circuit 140.

Intercom key 153 provides an easily operated intercom start capability which is very convenient for the operator. Intercom key 153 is a non-lock push button switch, and a detailed description of its function will be given below in connection with FIGS. 4 and 5. The respective outputs from the push button switches forming ten-key panel 151, talk switch 152, intercom key 153, channel selector key 154 and dip switch 155 are supplied to control circuit 140 for processing.

As mentioned above, the cordless telephone according to the present invention may be changed-over to any one of a plurality of modes and the physical connections therefor are as follows. In the telephone mode, hold relay 232 releases the incoming telephone call and either the loudspeaker/microphone of base unit 2A, that is, auxiliary telephone 4, or the electro-audio transducer of handset unit 1A, which is constituted by microphone 111 and loudspeaker 128, is placed in communication with telephone network line 3a. The connection between auxiliary telephone 4 and telephone network line 3a is accomplished directly through relay circuit 232. In such case, auxiliary telephone 4 is in telephonic communication with telephone network line 3a. The connection between the electro-audio transducer of handset unit 1IA and the telephone network line 3a is accomplished through transmission system 110 and receiving system 120 of handset unit 1A, transmission system 210 and receiving system 220 of base unit 2A and connecting circuit 230 including hybrid circuit 231 and relay circuit 232. In such case, handset unit 1A is in communication with base unit 2A, in that signals are transmitted therebetween over the radio waves, but with respect to telephonic communication, the handset electro-audio transducer 111,128 may be said to be in communication with the telephone network line 3a.

The cordless telephone may also be operated in the intercom mode, wherein the handset electro-audio transducer is in communication with auxiliary telephone 4 (the base electro-audio transducer) through connecting circuit 230. In the intercom mode, the hold relay within relay circuit 232 reserves the incoming telephone call appearing on telephone network line 3a. Thus, the operators at handset unit 1A and base unit 2A communicate with each other but not with the third party placing the incoming telephone call, who has been thus put on hold.

Both handset unit 1A and base unit 2A include actuable enabling means for enabling communication from the respective electro-audio transducer. In handset unit 1A, talk button 152 enables communication from handset electro-audio transducer 111,118 when it is moved to its TALK position to produce an enable signal to place handset unit 1A in the talk mode. Conversely, when talk button 152 is, placed in either its STANDBY position or its OFF position, it produces a disable signal at terminal S or T, which in turn is conveyed to control circuit 140. When in the intercom mode, control circuit 140 is responsive to the disable signal to end the intercom mode, and so talk button 152 and control circuit 140 may be regarded as a handset component of an intercom stop means. The STANDBY and OFF positions of talk button 152 may collectively be regarded as an actuated position for stopping the intercom mode.

When receiver 4b is lifted from its cradle, communication is enabled. When receiver 4b is returned to its cradle, communication is disabled. Conventionally, this is accomplished by a relay circuit within auxiliary telephone 4, which itself may be regarded as the transmitter of a signal when receiver 4b is hung up. When in the intercom mode, control circuit 240 is responsive to the disable signal to end the intercom mode, and thus receiver 4b and control circuit 240 may be regarded a base component of the intercom stop means. Receiver 4b mounted on its cradle may be regarded as in an actuated position for stopping the intercom mode.

An MSK (minimum shift key) modulating circuit 161 is connected to control circuit 140 for converting binary signals supplied thereto by control circuit 140 to an MSK signal Sm in the audio frequency band. These binary signals include identifying code ID, which will be described in greater detail later, and a dial signal DS corresponding to the telephone number entered through ten-key panel 151. Importantly, MSK signal Sm may also include control signals, for indicating to base unit 2A that talk button 152 has been moved or that intercom key 153 has been depressed. MSK signal Sm is supplied to audio frequency amplifier 112 for transmission to base unit 2A within signal Sd in the manner described above. The output of FM demodulating circuit 126 is also supplied to a reception detecting circuit 162 for detecting the presence or absence of signal Sd in the output. As is well known, the frequency components of the output are different in the presence or absence of signal Sd. A detection signal NSQ generated by reception detecting circuit 162 when signal Sd is present is supplied to control circuit 140.

Base unit 2A contains a similar MSK modulating circuit 261 for encoding the identifying code ID, channel selecting signal CH, appropriate control signals, and other signals in a signal Sm transmitted from base unit 2A to handset unit 1A. In handset unit 1A, an MSK demodulating circuit 163 is supplied with the output of FM demodulating circuit 126 to demodulate the identifying code ID, control signals and other signals encoded in MSK signal Sm. The demodulated signals are supplied to control circuit 140.

According to an important aspect of the present invention, when an incoming call is detected in base unit 2A and signal Sd is transmitted to handset unit 1A, signal NSQ is supplied to control circuit 140 and an appropriate control signal is supplied to a call tone generator 164 for generating a bell sound signal. The bell sound signal is supplied to audio amplifier 127 causing it to generate a bell sound, i.e. handset unit 1A rings. The bell sound signal may be generated when handset unit 1A is in the standby mode or when it is in the talk mode with cordless telephone 10 in the intercom mode, i.e. in a talk/intercom mode. In a talk/telephone mode, the handset operator is talking to an outside caller already, while in a standby/telephone mode, handset unit 1A is in the standby mode and the base operator is talking to the outside caller, i.e. cordless telephone 10 is in the telephone mode here also.

In the intercom mode the handset operator is holding handset unit 1A with its microphone close to his ear. In accordance with an aspect of the present invention, the bell sound at handset unit 1A is produced at a low volume in the talk/intercom mode to avoid producing a painfully loud sound directly in the operator's ear. In accordance with another aspect of the present invention, the bell sounds at both base unit 2A and handset unit 1A cease when the telephone mode is subsequently established.

Control circuit 140 of handset unit 1A generates a control signal TX supplied to frequency modulating circuit 113 to control whether or not FM signal Su is output therefrom. As described in the commonly assigned related applications cited above, the communication channel is established only when identity between identifying codes stored in base unit 2A and handset 1A is detected. When identity is detected, signal TX enables frequency modulated circuit 113 to output signal Su, whereas if identity is not detected, signal TX disables frequency modulating circuit 113.

Control circuit 140 also generates a muting signal MUTE supplied to audio frequency amplifier 127. As is conventional, muting signal MUTE is produced when no telephone conversation is in progress, to prevent extraneous noise from being generated and output through transducer 128.

Referring now to FIG. 3, control circuit 240 of base unit 2A is similar to control circuit 140 of handset unit 1A and performs many corresponding functions. Control circuit 240 provides similar means for detecting when the two identifying codes, one stored in base unit 2A and one received from handset unit 1A, are or are not identical, and for supplying control signal TX to FM modulator 213 to establish or cut off transmission of signal Sd, respectively. Thus, control circuit 240 includes CPU 241, ROM 242, RAM 243, and I/O port 244.

An MSK modulator 261, reception detecting circuit 262 and MSK demodulator 263 are provided which perform similar functions to the corresponding elements in handset unit 1A, and will not be further described. A tone generating circuit 264 generates a tone encode signal TE corresponding to the telephone number for an outgoing call, which signal TE is supplied to audio frequency amplifier 227 and thence to hybrid circuit 231 for transmission to telephone network line 3a.

Importantly, a bell signal detecting circuit 265 is connected to telephone network line 3a to detect an incoming bell signal indicating the presence of an incoming call. The output detected signal BL of bell signal detecting circuit 265 is supplied to control circuit 240, which is responsive thereto to cause a call bell or ringer 266 to ring. Control circuit 240 also sends a control signal in MSK signal Sm to control circuit 140, which in turn causes call tone generator 164 to generate its bell sound signal. Thus, both handset unit 1A and base unit 2A will ring in response to the detection of an incoming telephone call.

A signal line 232' is provided between control circuit 240 and relay circuit 232. In accordance with connection control signals supplied from control circuit 240, relay circuit 232 connects and disconnects hybrid circuit 231 and auxiliary telephone 4 with telephone network line 3a and reserves and releases the incoming call.

According to an important aspect of the present invention, an intercom key 253 is also provided on base unit 2A, and is operated in conjunction with intercom key 153 on handset unit 1A to establish the intercom mode.

When an outgoing call is to be made, the call can be placed either from auxiliary telephone 4 or from handset unit 1A remote from base unit 2A. In both cases, the operation of the cordless telephone is controlled by CPU 241 or by CPUs 141,241, respectively, under the control of control programs stored in ROMs 142 and 242. The description below is given for the second case, that is, the case in which a call is placed from handset unit 1A by way of example. Initially, it is understood that handset unit 1A and base unit 2A have been set to the same channel A or B by appropriate operation of channel selecting key 154.

To make an outgoing call, talk button 152 is placed in its TALK position so that contact 152a contacts fixed contact T. An indication thereof is sent to CPU 141, and control signal TX is generated to enable frequency modulating circuit 113 to transmit a signal, which at this initial state is an unmodulated carrier signal. Then dip switch 155 is actuated to enter an identifying code $ID_1$ into CPU 141. Alternatively, CPU 141 could derive a previously generated identifying code $ID_1$ from RAM 143. Identifying code $ID_1$ is supplied to MSK modulating circuit 161, which converts it to MSK signal Sm and supplies it to frequency modulating circuit 113. Since frequency modulating circuit 113 is enabled to transmit signals, identifying code $ID_1$ is transmitted to base unit 2A in FM signal Su. In base unit 2A, reception detecting circuit 262 generates detection signal NSQ in response to the presence of signal Su, and thereupon control circuit 240 enters a check mode to check for identity between the received identifying code $ID_1$ and a stored identifying code $ID_2$ previously entered by actuation of dip switch 255. Signal Sm is derived from signal Su in FM demodulator 226 and identifying code $ID_1$ in signal Sm is derived in MSK demodulator 263 and passed to CPU 241. CPU 241 then reads identifying code $ID_2$ previously stored in RAM 243 and determines whether or not the two identifying codes $ID_1$ and $ID_2$ are identical. If they are not identical, which usually would mean that the telephone call is being made by a handset of a different telephone set, signal TX is adjusted to disable frequency modulating circuit 213 so that further signal transmission is cut off and base unit 2A remains in standby. On the other hand, if identification codes $ID_1$ and $ID_2$ are identical, frequency modulating circuit 213 remains enabled to transmit signal Sd and to establish the communication channel. In such case, control circuit 240 stops producing muting signal MUTE, so that conversation may take place. Furthermore, since signal Sd is transmitted back to handset unit 1A after identity of identifying codes had been detected in base unit 2A, signal NSQ in handset unit 1A is supplied to control circuit 140, which produces signal TX so as to enable FM modulator 113 and further stops producing muting signal MUTE to release audio frequency amplifier 127. Thus handset unit 1A is also enabled.

At this time, a dial tone is generated in handset unit 1A, and, upon operation of ten-key panel 151, dial signal DS corresponding to the telephone number being dialed is generated in CPU 141 and supplied to MSK modulating circuit 161 for conversion to MSK signal Sm and subsequent transmission to base unit 2A.

Then in base unit 2A dial signal DS is derived in MSK demodulating circuit 263. In response thereto, control circuit 240 causes tone generating circuit 264 to generate tone encode signal TE, which is transmitted through audio frequency amplifier 227, hybrid circuit 231 and relay 232 to telephone network line 3a. The subsequent operation of the cordless telephone in transmitting and receiving the telephone message signals is as described above and the description will not be repeated.

The operation of the cordless telephone when an incoming call is received will now be described. It is initially assumed that movable contact 152a of talk switch 152 is at contact S, so that cordless telephone 10 is in a standby condition ready to receive a call. Of course, an incoming telephone call may appear when cordless telephone 10 is in the intercom mode. The present invention provides advantageously for the receiption of such a telephone call. In either case, when the incoming message signal on telephone network line 3a is received by base unit 2A, detected signal BL is derived in bell signal detecting circuit 265 and supplied to CPU 241 (FIG. 3). For the case in which cordless telephone 10 was initially in the standby condition, signal TX is generated to enable frequency modulating circuit 213. Identifying code $ID_2$ read from RAM 243 is converted to signal Sm and supplied to audio frequency amplifier 212, so that identifying code $ID_2$ is transmitted via signal Sd to handset unit 1A.

In handset unit 1A (FIG. 2), signal Sd is received and signal NSQ is derived to put control circuit 140 in the check mode. Identifying code $ID_2$ is derived in MSK demodulator 163 and CPU 141 checks for the identity between received identifying code $ID_2$ and stored identifying code $ID_1$ from RAM 143. If they are not identical, control signal TX disables frequency modulating circuit 113 and the telephone remains in the standby mode. If the two identifying codes are identical, frequency modulating circuit 113 remains enabled, and signal Su is transmitted to base unit 2A. Signal NSQ is derived therein, so that base unit 2A remains enabled and the communication channel is established. Control circuit 140 causes call tone generator 164 to form a bell signal, which is supplied through audio amplifier 127 to loudspeaker 128 to create the conventional bell sound. Thereafter, if handset unit 1A is picked up, and talk button 152 is placed in its TALK position, loudspeaker 128 stops ringing, amplifiers 127 and 227 are released from muting and handset unit 1A receives the call.

The incoming call announced at handset unit 1A by the bell sound from loudspeaker 128 is also announced at base unit 2A by the bell sound from ringer 266. The incoming telephone call may be received at base unit 2A by lifting receiver 4b from its cradle in body 4a. Signal TX inhibits FM modulating circuit 213 from transmitting signal Sd, and ringer 266 and loudspeaker 128 cease producing the respective bell sounds. At this time the base operator receives the incoming call. The means by which loudspeaker 128 and ringer 266 are caused to stop ringing under these circumstances may advantageously be the same as those, described below, operative when the incoming call appears when cordless telephone 10 is in the intercom mode.

The operation of cordless telephone 10 according to the present invention in establishing the intercom mode will now be described. Again assume that cordless telephone 10 was previously in a standby condition, and there is no incoming telephone call. If the handset operator wishes to initiate intercom mode communication, he moves talk switch 152 to its TALK position and then depresses intercom key 153. Since movable contact 152a of talk switch 152 contacts fixed contact T, signal TX enables communication between handset unit 1A and handset unit 2A, and so MSK signal Sm will include a component indicative of the fact that intercom key 153 has been depressed. In response thereto, in base unit 2A, control circuit 240 transmits a signal to ringer 266 to cause the same to produce the bell sound. Thereupon, if receiver 4b is lifted up from body 4a of auxiliary telephone 4, a signal is transmitted to control circuit 240, which in turn transmits another signal to ringer 266 to cause the same to stop producing the bell sound. A connection control signal from control circuit 240 to relay circuit 232 through line 232' causes the loudspeaker/microphone of auxiliary telephone 4 to be connected through relay circuit 232 to hybrid circuit 231. Thus the loudspeaker/microphone means of base and handset units 2A, 1A are in telephonic communication with each other, and cordless telephone 10 is in the intercom mode.

Correspondingly, when the base operator wishes to initiate intercom mode communication, he lifts receiver 4b of auxiliary telephone 4 and depresses intercom key 253. Again, the communication channel between base unit 2A and handset unit 1A is established and MSK signal Sm contains components indicative of the fact that intercom key 253 has been depressed. As a consequence, in handset unit 1A, control circuit 140 causes loudspeaker 128 to emanate the bell sound, and control circuit 240 transmits a connection control signal to relay circuit 232 to cause it to connect auxiliary telephone 4 to hybrid circuit 231. Accordingly, if the handset operator answers by moving talk button 152 to its TALK position, a signal is transmitted to control circuit 140, which in turn produces a control signal to cause loudspeaker 128 to stop producing the bell sound and a second control signal is transmitted to control circuit 240 of base unit 2 to establish the intercom mode.

Figure 4:
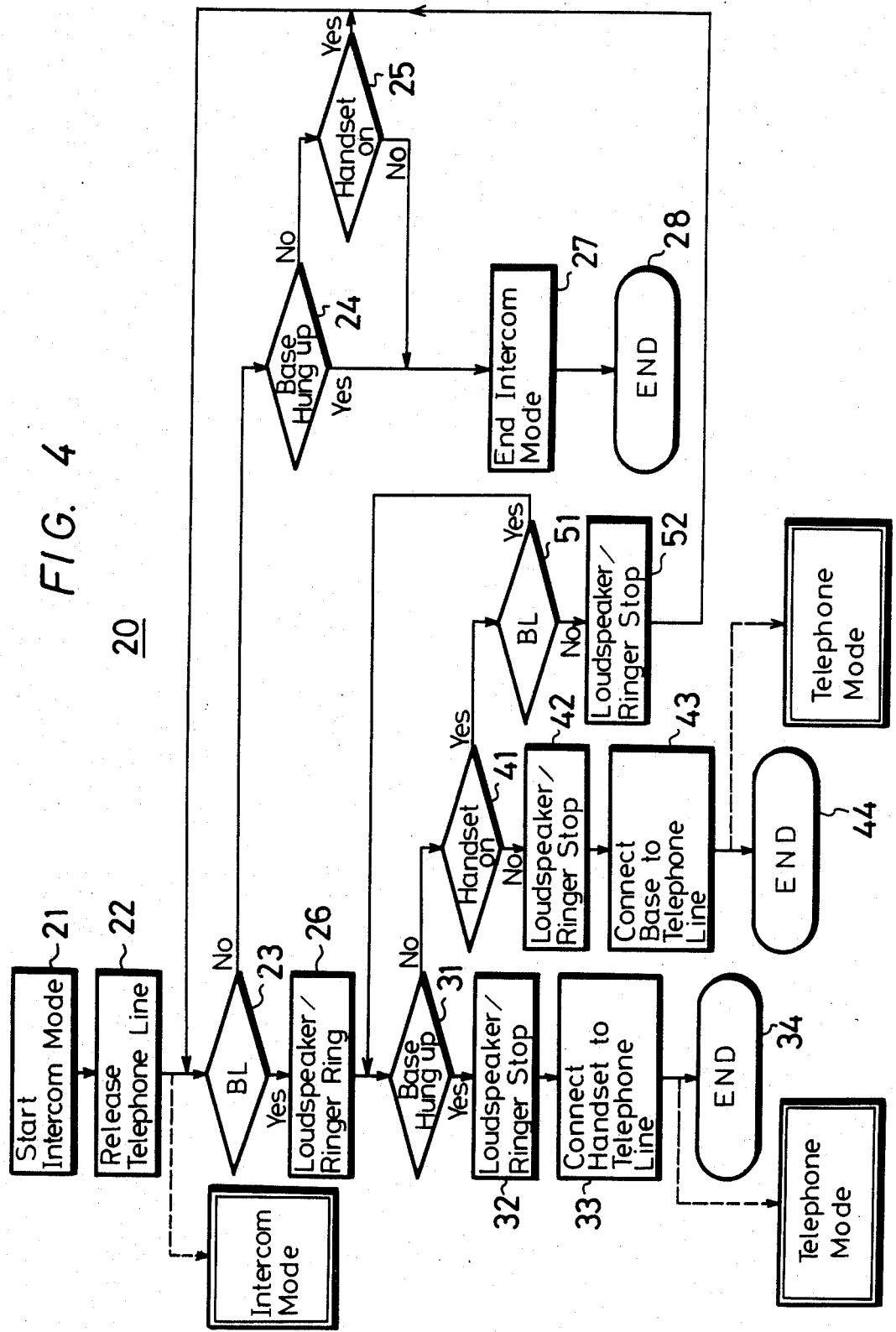
FIG. 4 is a flowchart of a control program of the base unit of FIG. 3 when either of the base and handset units is operative in the intercom mode for receiving an incoming telephone call.

In accordance with an important aspect of the present invention, an incoming call appearing on telephone network line 3a which appears when cordless telephone 10 is in the intercom mode may be easily received by either handset unit 1A or base unit 2A. To this end, when bell sound detector 265 detects the presence of the incoming phone call and transmits detected signal BL, to control circuit 240, control circuit 240 loads a routine 20 stored in ROM 242 and executes it. A flowchart of routine 20 is illustrated in FIG. 4.

Routine 20 begins in step 21, wherein cordless telephone 10 is in the intercom mode so that base unit 2A and handset unit 1A are in communication with each other. In step 22, control circuit 240 sends a connection control signal to relay circuit 232 to connect itself to telephone network line 3a, so that an incoming call may be detected by bell sound detector 265. Thus, at this point, cordless telephone 10 is in the intercom mode and is enabled to receive an incoming telephone call.

In step 23, the presence or absence of detected output BL of bell sound detector 265 is judged. The presence of detected signal BL indicates that an incoming call is present. If detected signal BL is not present, routine 20 proceeds to step 24, wherein it is determined whether the receiver 4b of auxiliary telephone 4 has been hung up. During intercom communication, of course, receiver 4b is not hung up, and so routine 20 proceeds to step 25. In step 25, it is determined whether signal Su is being transmitted from handset unit 1A, i.e. whether talk button 152 is still at the TALK position. Again, in intercom communication, talk button 152 is at the TALK position, and so routine 20 returns to step 23. In the intercom mode, therefore, when no incoming telephone call is present on telephone network line 3a, routine 20 loops through steps 23, 24 and 25 until either the base operator hangs up (receiver 4b is hung up), the handset operator hangs up (signal Su stops), or the incoming call appears (detected signal BL appears).

If, for example, receiver 4b is hung up, routine 20 moves from step 24 to step 27, to end the intercom mode. For the case where receiver 4b is hung up, control circuit 240 is operative to stop transmissions of signal Sd from base unit 2A, and base unit 2A is put in a standby condition to await either a new intercom mode for communication with handset unit 1A or the telephone mode for communication with telephone network line 3a. Since no incoming call is present, handset unit 1A is thus not in communication with any party, and may either be disabled or used to initiate a new intercom or telephone mode. Routine 20 then ends at step 28. Similarly, if TALK button 152 is moved from its talk position to either its STANDBY or OFF positions, signal Su is no longer transmitted from handset unit 1A, and routine 20 would move from step 25 to step 27 to end the intercom mode. Now in step 27, it is handset unit 1A which ceases transmission of signal Su and is placed in the standby condition to await the next establishment of an intercom or telephone mode, and routine 20 ends in step 28.

Now assume that the telephone is in the intercom mode, routine 20 is looping through steps 23, 24 and 25, and an incoming call appears on telephone network line 3a. The resulting detected signal BL is received by control circuit 240 in step 23, and routine 20 moves to step 26, wherein control circuit 240 supplies a signal to ringer 266 to cause it to produce a bell sound and also transmits a control signal to handset unit 1A indicative of the presence of the incoming telephone call. In response thereto, control circuit 140 in handset unit 1A supplies a signal to loudspeaker 128 to cause it to emanate its bell tone. Thus, in step 26, the presence of the incoming call is announced at both base unit 2A and handset unit 1A by the respective bell sounds. Routine 20 now begins a loop through steps 31, 41 and 51. In step 31, it is determined whether receiver 4b is hung up, just as in step 24. If it is not, the routine moves to step 41, wherein it is determined whether Su is being transmitted from handset unit 1A, just as in step 25. If it is, routine 20 proceeds to step 51, wherein it is determined whether detected signal BL of detecting circuit 265 is still being produced. That is, in step 51 it is determined whether or not the outside caller is still trying to reach the base and handset operators, or whether he has given up and hung up his own telephone. Assuming that detected signal BL continues to appear, routine 20 loops back to step 31 and then repetitively loops through steps 31, 41 and 51, all the while with cordless telephone 10 in the intercom mode and with the respective bell sounds being produced at both handset unit 1A and base unit 2A.

The incoming telephone call may be received by either the base or handset operator. It should be understood that at this point both operators are aware of the presence of the incoming telephone call and are talking to each other and so may determine between themselves which operator will receive the telephone call. If they decide that the handset operator will receive the telephone call, the base operator hangs up receiver 4b. This is detected in step 31, and routine 20 moves to step 32, wherein a control signal from control circuit 240 causes ringer 266 to cease producing the bell sound, and another control signal indicative of the disabled state of auxiliary telephone 4 is transmitted to handset unit 1A. In response, control circuit 140 supplies a control signal to call tone generator 164 to cause it to stop producing its bell sound signal in turn. Routine 20 then moves to step 33, wherein control circuit 240 causes relay circuit 232 to connect hybrid circuit 231 to telephone network line 3a. By this connection, the handset microphone/loudspeaker means is connected through base unit 2A to outside line 3a, and the telephone mode is established with handset unit 1A in communication with telephone network line 3a. The handset operator may now talk to the outside caller and routine 20 then ends in step 34.

Now suppose that the base operator is to receive the incoming telephone call. Now it is the handset operator who disables his unit by moving talk button 152 to its STANDBY or OFF position, to cause the cessation of signal Su. This is detected in step 41, and routine 20 moves to step 42, which is similar to step 32 in that ringer 266 and bell tone generator 164 are both caused to cease producing their respective bell sounds in response to control signals from the respective control circuits. Then in step 43, handset unit 1A ceases transmission of signal Sd, which is detected in base unit 2A, so that control circuit 240 causes relay circuit 232 to connect auxiliary telephone 4 to telephone network line 3a. Now the base operator may talk to the incoming caller, and routine 20 ends in step 44.

Finally, if neither the base or handset operator hangs up, but rather the incoming caller hangs up, detected signal BL will no longer be supplied to control circuit 240. This is detected in step 51, and routine 20 moves to step 52 wherein, as in steps 32 and 42, ringer 266 and bell tone generator 164 are both caused to cease producing their respective bell sounds. Routine 20 then moves back to step 23, so that the cordless telephone 10 remains in the intercom mode and is again enabled to detect the presence of a new incoming telephone call.

Therefore, the cordless telephone according to the present invention enables an incoming telephone call appearing while the telephone is in the intercom mode to be easily received by either the handset operator or the base operator. This is accomplished by the simple procedure of having whichever operator does not wish to receive the outside telephone call disable his unit, either by hanging up receiver 4b or by moving talk button 152 to the OFF or STANDBY position. Since the two operators are in communication with each other at the time when the telephone call appears, they can easily decide which one is to receive the call.

In accordance with another important aspect of the present invention, means are provided within handset unit 1A for controlling the volume of the bell sound produced through loudspeaker 128. If the telephone is in the intercom mode when the incoming telephone call appears, the handset operator will be holding handset unit 1A close to his head with his ear directly opposing loudspeaker 128. A loud ringing tone produced through loudspeaker 128 would be unpleasant and possibly harmful. On the other hand, it is desirable to make the bell sound loud when handset unit 1A is in the standby mode, so as to summon the handset operator even from a distance. To remove this dilemma, the bell sound is produced at a first volume when handset unit 1A is in the standby mode, and at a second, lesser volume when handset unit 1A is in the talk mode.

At the base unit 2A, ringer 266 is located at base unit 2A itself, not in receiver 4b of auxiliary telephone 4, so that the bell sound produced thereby is not produced directly into the base operator's ear. Of course, should the base unit 2A be designed to produce the bell sound through receiver 4b, or by any other means such that the bell sound is produced through the loudspeaker also producing telephone conversation, volume control means similar to those in handset unit 1A may be provided at base unit 2A, and this falls within the scope of the present invention.

In accordance with the present invention, a second preferred embodiment of the cordless telephone is illustrated in FIG. 5, which is a schematic illustration of a portion of the circuitry of handset unit 1A', and elements corresponding to those illustrated in FIG. 2 bear the same reference numerals and will not be described in detail. Furthermore, certain elements illustrated in FIG. 2 but not pertaining to volume control have been omitted from FIG. 5 for clarity of illustration, but it will be understood that these elements are present in handset unit 1A'.

As shown in FIG. 5, a switch 170 is provided in the signal path between call tone generator 164 and audio amplifier 127. Switch 170 is operated in gang with talk button 152, and similarly thereto has a moveable contact 170a and three fixed contacts: an off mode contact O', a standby mode contact S' and a talk mode contact T'. Contact O' is floated, contact S' is connected directly to audio amplifier 127, and contact T' is connected to audio amplifier 127 through an attenuator 171, which in the illustrated embodiment is a resistor. In the off mode, when movable contact 152a of talk button 152 contacts fixed contact O, turning off power to most elements within handset unit 1A', movable contact 170a of switch 170 contacts fixed contact O', and no signal is provided to amplifier 127. In the standby mode, movable contact 170a contacts fixed contact S' and the signal from call tone generator 164 is supplied directly to audio amplifier 127. Finally, in the talk mode, movable contact 170a contacts fixed contact T', so that the signal from call tone generator 164 is supplied to audio amplifier 127 through attenuator 171. As a result, the signal to be amplified by audio amplifier 127 is attenuated, so that the resultant volume of sound produced at loudspeaker 128 is reduced.

It should be noted that in this second embodiment of the cordless telephone according to the present invention, talk button 152 has two functions. It serves as an actuable switch for terminating the intercom mode and establishing the telephone mode with base unit 2A in communication with an incoming telephone call, and also serves as an actuable switch for selecting one of the two volumes.

Thus, the cordless telephone according to the present invention provides improved and simplified communication and enables either the base or handset operator to receive an incoming telephone call by a simple operation. Furthermore, when an incoming telephone call appears while the telephone is in the intercom mode, the volume of the bell sound or ringing produced at the handset unit is reduced to avoid an unpleasant or painfully loud noise from being produced directly into the handset operator's ear.

In the preferred embodiments described above, the base loudspeaker/microphone or electro-audio transducer is constituted by auxiliary telephone 4. However, it is possible for base unit 2A to incorporate its own loudspeaker, microphone, 10-key panel, etc., thereby eliminating the need for a separate auxiliary telephone.

Furthermore, the operations of circuits numbered 161–163 and 261–263 may be implemented by software within control circuits 140 and 240, respectively. The circuitry required is very simple and control circuits 140, 240 may be advantageously embodied in microcomputers suitably programmed in accordance with the flowchart of FIG. 4. Communication with telephone network line 3a may be achieved by dial pulse communication.

Having specifically described preferred embodiments of the invention, it will be apparent that the invention is not limited to such embodiments, and that many modification and variations may be effected therein by one skilled in the art without departing from the spirit of scope of the present invention as defined in the appended claims.

We claim:

1. A cordless telephone, comprising:
   a base unit connectable to a telephone network line for receiving and transmitting signals therethrough;
   a handset unit selectively mountable upon and separable from said base unit;
   said base and handset units including respective means for the transmission and reception of signals therebetween over electromagnetic waves, said handset unit further including handset loudspeaker/microphone means and said base unit having base loudspeaker/microphone means associated therewith;
   said telephone having a telephone mode of operation, wherein the loudspeaker/microphone means of either said base unit or said handset unit is in communication with said telephone network line, and an intercom mode of operation, wherein said handset and base loudspeaker/microphone means are in communication with each other;
   means for selectively establishing one of said telephone and intercom modes;
   call detecting means for detecting an incoming telephone call appearing on said telephone network line and for producing a detected signal in response thereto;
   first bell sound generating means at said base unit for generating a first bell sound in response to said detected signal at least in said intercom mode;
   second bell sound generating means at said handset unit for generating a second bell sound in response to said detected signal at least in said intercom mode; and
   intercom stop means receiving said detected signal and being then selectively actuable at one of said base and handset units so as to be operative in said intercom mode for causing said first and second bell sound generating means to cease generating said first and second bell sounds, respectively, and for causing said means for selectively establishing one of said modes to establish said telephone mode with the loudspeaker/microphone means of the other of said base and handset units in communication with said telephone network line.

2. A cordless telephone according to claim 1, wherein said base loudspeaker/microphone means is included in a standard telephone having a receiver and a cradle, and said intercom stop means is actuated at said base unit by the mounting of said receiver onto said cradle.

3. A cordless telephone according to claim 1, wherein said intercom stop means includes first switch means actuable at said base unit and second switch means actuable at said base unit.

4. A cordless telephone according to claim 1, further comprising connection means for selectively connecting said base and handset loudspeaker/microphone means with said telephone network line and each other, said means for selectively establishing one of said modes supplying a plurality of connection control signals to said connection means to control the operation thereof.

5. A cordless telephone according to claim 4, wherein said connection means includes relay means for selectively connecting any two of said means for the transmission and reception of signals of said base unit, said base loudspeaker/microphone means and said telephone network line in response to said connection control signals.

6. A cordless telephone according to claim 1, wherein said intercom stop means includes base and handset components, said base component is operative upon actuation of said intercom stop means at said base unit after receipt of said detected signal for supplying a first control signal to said first bell sound generating means to cause the same to cease generating said first bell sound and for supplying a second control signal to said handset component, and said handset component is responsive to said second control signal for supplying a third control signal to said second bell sound generator to cause the same to cease generating said second bell sound.

7. A cordless telephone according to claim 6, wherein said handset component is operative upon actuation of said intercom stop means at said handset unit after receipt of said detected signal for supplying said third control signal to said second bell sound generating means to cause the same to cease generating said second bell sound and for supplying a fourth control signal to said handset component, and said handset component is responsive to said fourth control signal for supplying said first control signal to said first bell sound generating means for causing the same to cease generating said first bell sound.

8. A cordless telephone according to claim 7, further comprising connection means for selectively connecting said base and handset loudspeaker/microphone means with said telephone network line and each other in response to connection control signals supplied thereto; and
   said base component is further operative upon said subsequent actuation at said base unit for supplying a first connection control signal to said connection means to cause the same to connect said handset loudspeaker/microphone means to said telephone network line.

9. A cordless telephone according to claim 8, wherein said base component is responsive to said fourth control signal for supplying a second connection control signal to said connection means to cause the same to connect the base loudspeaker/microphone means to said telephone network line.

10. A cordless telephone according to claim 1, wherein said handset unit has talk and standby modes of operation wherein said means for selectively establishing one of said telephone and intercom modes is enabled and disabled, respectively;

actuable switch means at said handset unit for selectively establishing one of said talk and standby modes; and said second bell sound generating means is responsive to said modes of said handset unit and said telephone so as to generate said second bell sound at a first volume in said standby mode and at a second, lesser volume when said handset unit is in said talk mode while the telephone is in said intercom mode.

11. A cordless telephone according to claim 10, wherein actuation of said switch means in said talk mode to establish said standby mode actuates said intercom stop means at said handset unit.

12. A cordless telephone according to claim 10, wherein said switch means has a first position for establishing said standby mode and a second position for establishing said talk mode and said second bell sound generating means includes second switch means ganged with the first mentioned switch means and having corresponding first and second positions for controlling said volume in accordance with the position of said first switch means.

13. A cordless telephone according to claim 12, wherein said second bell sound is produced through said handset loudspeaker/microphone means;

said second switch means in said first position provides said second bell sound directly to said handset loudspeaker/microphone means, and in said second position provides said second bell sound to said handset loudspeaker/microphone means through an attenuating means.

14. A cordless telephone, comprising:

a base unit connectable to a telephone network line for receiving and transmitting signals therethrough;

a handset unit selectively mountable upon and separable from said base unit;

said base and handset units including respective means for the transmission and reception of signals therebetween over electromagnetic waves, said handset unit further including handset loudspeaker/microphone means and said base unit having base loudspeaker/microphone means associated therewith;

said telephone having a telephone mode of operation, wherein the loudspeaker/microphone means of either said base unit or handset unit is in communication with said telephone network line, and an intercom mode of operation, wherein said handset and base loudspeaker/microphone means are in communication with each other;

means for selectively establishing one of said telephone and intercom modes;

said handset unit having talk and standby modes of operation wherein said means for selectively establishing one of said telephone and intercom modes is enabled and disabled, respectively;

actuable switch means of said handset unit for selectively establishing one of said talk and standby modes;

call detecting means for detecting an incoming telephone call appearing on said telephone network line and for producing a detected signal in response thereto;

first bell sound generating means at said base unit for generating a first bell sound in response to said detected signal at least in said intercom mode;

second bell sound generating means at said handset unit responsive to said detected signal for generating a second bell sound at a first volume in said standby mode and at a second, lesser volume when said handset unit is in said talk mode while the telephone is in said intercom mode;

said first and second bell sound generating means being further responsive to said modes of the telephone so that, at a time when said telephone is in said intercom mode and said first and second bell sound generating means are generating said bell sounds, change-over to said telephone mode causes said first and second bell sound generating means to cease generating the respective bell sounds.

15. A cordless telephone according to claim 14, further comprising intercom stop means receiving said detected signal and being then selectively actuable at one of said base and handset units operative in said intercom mode for causing said first and second bell sound generating means to cease generating said first and second bell sounds, respectively, and for causing said means for selectively establishing one of said modes to establish said telephone mode with the other of said base and handset units in communication with said telephone network line.

16. A cordless telephone according to claim 15, wherein actuation of said switch means in said talk mode actuates said intercom stop means at said handset unit.

17. A cordless telephone according to claim 14, wherein said second bell sound generating means includes volume control means responsive to the existing mode of said handset unit for selecting one of said first and second volumes.

18. A cordless telephone according to claim 17, wherein said switch means has a first position for establishing said standby mode and a second position for establishing said talk mode, and said volume control means includes second switch means ganged with the first mentioned switch means and having corresponding first and second positions for selecting one of said first and second volumes.

19. A cordless telephone according to claim 18, wherein said second bell sound is produced through said handset loudspeaker/microphone means;

said second switch means in said first position providing said second bell sound directly to said handset loudspeaker/microphone means, and in said second position providing said second bell sound to said handset loudspeaker/microphone means through an attenuating means.

* * * * *